Nov. 6, 1962 S. A. SHERNO 3,061,881
METHODS FOR PRODUCING THREE DIMENSIONAL SIGNS
Filed May 5, 1959
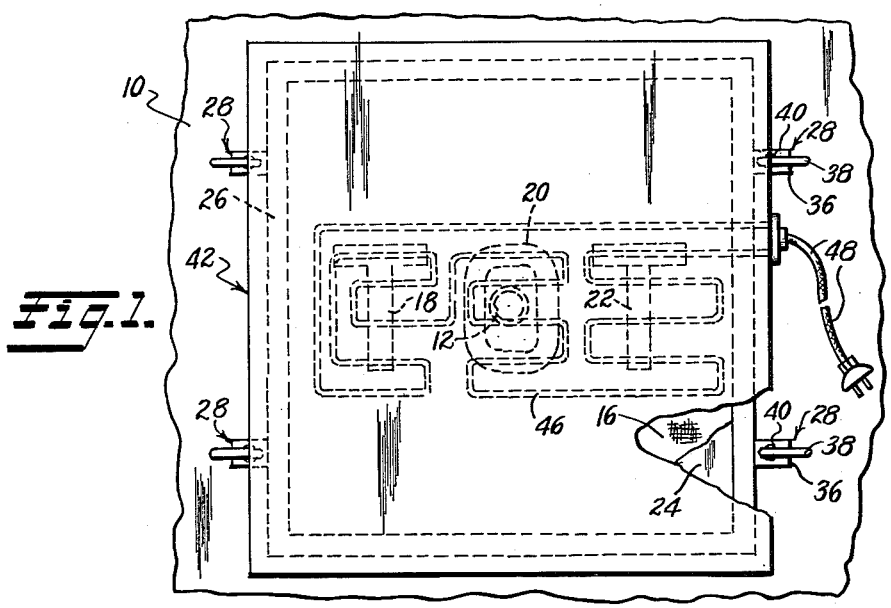
Fig.1.
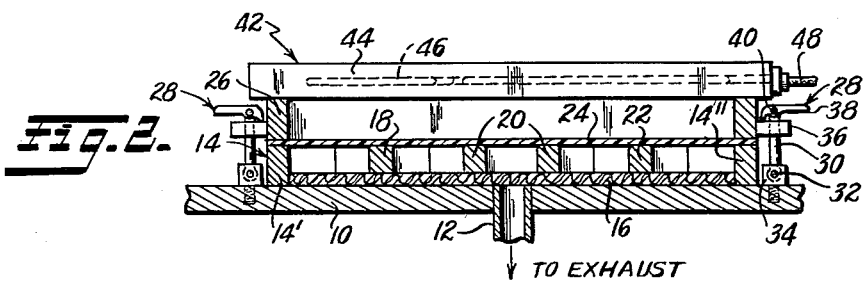
Fig.2.
TO EXHAUST
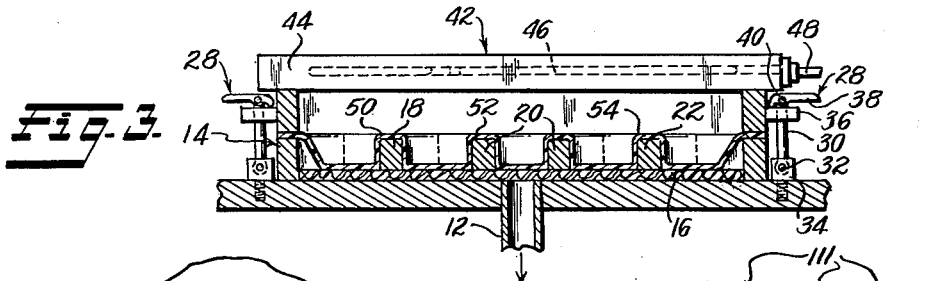
Fig.3.
Fig.5.
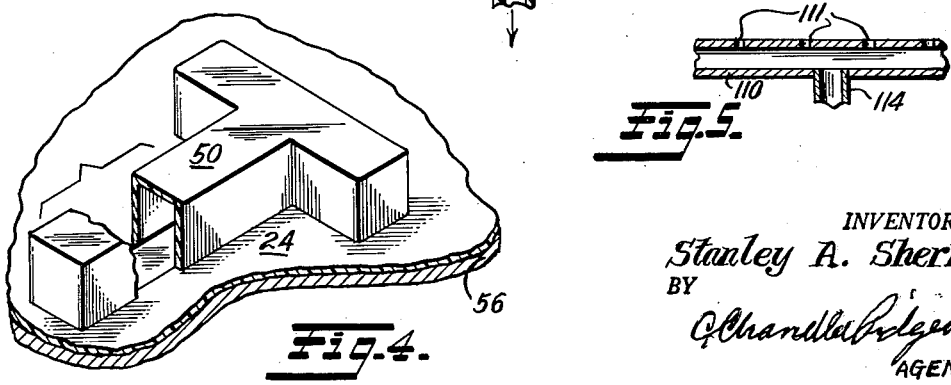
Fig.4.
INVENTOR.
Stanley A. Sherno
BY
G. Chandler Pidgeon
AGENT

United States Patent Office 3,061,881
Patented Nov. 6, 1962

3,061,881
METHODS FOR PRODUCING THREE DIMENSIONAL SIGNS
Stanley Anthony Sherno, Hazleton, Pa., assignor to George W. Woelfel, Hazleton, Pa.
Filed May 5, 1959, Ser. No. 811,122
1 Claim. (Cl. 18—47.5)

This invention relates to a method for producing three dimensional signs, and more particularly to a method for producing three dimensional multi-colored signs from a sheet of thermoplastic material.

An object of this invention is the provision of a method of using movable discrete letters, figures or indicia, to form a three dimensional sign from a sheet of thermoplastic material.

An additional object of this invention is the provision of a method of producing multi-colored three dimensional signs from a sheet of thermoplastic material.

A further object of this invention is the provision of a novel method of producing a multi-colored three dimensional sign having a background of one color and selected portions of the sign in different colors.

Another object of this invention is the provision of a method for producing various signs without the use of fixed molds.

Still another object of this invention is the provision of a method whereby various signs may be produced from sheets of thermoplastic material by using independent discrete matrices.

These and other objects will appear from a consideration of the following specification taken with the accompanying drawings forming a part thereof.

In the drawings, wherein like parts are represented by like characters of reference:

FIG. 1 is a top plan view with parts broken away of a suitable form of a device for producing a sign according to this invention;

FIG. 2 is a longitudinal section before heating and exhausting;

FIG. 3 is a section similar to FIG. 2 after heating and exhausting;

FIG. 4 is a fragmentary perspective of a portion of a sign produced by the method of this invention, and FIG. 5 is a fragmentary view of a modified form of table.

Referring now to the drawings, I show a table 10 which may be of smooth metal or may have an upper surface of smooth metal. The table 10 is connected to a source of sub-atmospheric pressure by means of one or more pipes 12. On the table 10 I place an open frame 14, shown as being square. The shape of the frame 14 is immaterial and it may be rectangular or any other closed shape to accommodate the sign to be made.

In the frame 14, and on the table 10, I place a sheet of loosely woven fabric 16 for a purpose later to appear. On the fabric 16 I place letters, figures or other indicia, such as the letters T, O and T indicated by the numerals 18, 20 and 22 respectively. These indicia or matrices may be of any desired outline that is to be delineated on the completed sign.

Over the matrices 18, 20, 22 etc., I place a sheet of transparent thermoplastic material 24, which extends over the sides 14', 14" of the frame 14. A second frame 26 of the same configuration as the frame 14 is placed over the frame 14, in contact with the sheet 24. The frame 26 is clamped on the frame 14, by means of a plurality of clamps 28. Each of the clamps 28 may comprise a rod 30 pivoted at 32 on a block 34 threaded or otherwise secured to the table 10. The upper end of the rod 30 passes between the tines of a forked block 36 on the side 14' and has a clamping lever 38 pivoted at 40. The clamp 28 as described is only representative, as other known clamping means may be used.

After the sheet 24 of plastic material is clamped in place, a heater 42 is then placed over the assembled frames 14, 26. The heater 42 comprises a housing 44 having heating elements 46 therein which are connected to a suitable electric supply by means of a conductor cord 48. The heater elements 46 may be of any suitable type such as calrod elements. Heat from the elements 46 softens the thermoplastic material of the sheet 24. Though electric heating, only, is shown, it is to be understood that gas or other suitable heat may be used. When the desired degree of softness has been attained, the device is connected to a source of subatmospheric pressure by means of the pipe 12. The reduction of pressure below the sheet 24 causes it to drape about and partially surround the matrices 18, 20, 22 etc., and finally assume the positions shown in FIG. 3. The heat is now removed and the sheet 24 is allowed to set in its new position. When cooling and setting the material of the sheet 24 lightly grips the matrices. The fabric 16 allows air to be withdrawn from closed areas, such as the letter O, indicated by numeral 20.

After cooling and setting of the sheet 24 is attained the frames 14 and 26 are disassembled. The sheet 24 may now be removed. The matrices 18, 20, 22 etc., will remain in the newly formed letters 50, 52 and 54 as the sign is removed from the frame 14. The letters 50, 52, 54 etc., thus stand up from the sheet 24 in a three dimensional effect. The back of the sheet 24 is now sprayed or otherwise coated with the desired base or background color, say white. Next one or more matrices are removed from letters or indicia which are to have a color such as red applied to them, differing from the background color, and this second color is applied to these indicia. Then additional matrices are removed from formed indicia which are to have a third color such as blue, applied thereto. Finally the remaining matrices are removed from the indicia which are to have the fourth color, say green applied thereto, and this fourth color is applied. The result is a plane background of one color having a plurality of indicia thereon in a plurality of colors. While I have described a background color and three other colors, this is by no means limiting. It is readily apparent that a sign having ten letters or words for example may have ten colors by following the method above described.

The sign thus formed is cemented or otherwise secured to an opaque sheet 56 of metal, wood, hardboard or other suitable material to facilitate installation in a desired location.

As shown in FIG. 5 the table 110 may be hollow and may have a plurality of openings 111. The interior of the table 110 may be connected to the source of subatmospheric pressure by means of a conduit 114.

While I have illustrated and described a preferred form of my invention, it is to be understood that this is for the purpose of setting forth the principles involved, and it is also to be understood that modifications may be made within the skill of the art and the scope of the appended claim.

I claim:

In a method of forming a three dimensional multi-colored sign wherein a sheet of clear plastic is drape-formed about a plurality of discrete matrices, the improvement comprising the steps of:

(a) removing the sheet from the drape-forming operation with the matrices imbedded in sockets formed thereby,
(b) coating the back of the sheet with the matrices thereon with a base color,
(c) removing selected matrices and coating the exposed sockets with a second color,
(d) removing other selected matrices and coating the exposed sockets a third color,
(e) continuing removal of matrices and coating until the desired arrangement of colors is attained,
(f) mounting the sheet on a rigid support.

References Cited in the file of this patent

UNITED STATES PATENTS

| | | |
|---|---|---|
| 1,132,502 | Walling | Mar. 16, 1915 |
| 1,564,578 | Kennedy | Dec. 8, 1925 |
| 2,013,194 | Vaughn | Sept. 3, 1935 |
| 2,651,079 | Michaelson et al. | Sept. 8, 1953 |
| 2,651,871 | Lynden | Sept. 15, 1953 |
| 2,777,165 | Hurt | Jan. 15, 1957 |
| 2,779,057 | Graham et al. | Jan. 29, 1957 |

OTHER REFERENCES

"Vacuum Forming Equipment and Methods," published in Modern Plastics, volume 31, No. 9, May 1954 (pages 90–91).

"Vacuum Forming Equipment and Methods," published in Modern Plastics, volume 31, No. 9, May 1954 (pages 188–197).